US009673645B1

(12) United States Patent
Emerick

(10) Patent No.: US 9,673,645 B1
(45) Date of Patent: Jun. 6, 2017

(54) CHARGING AND POWERING DEVICE

(71) Applicant: Bruce Emerick, Carriere, MS (US)

(72) Inventor: Bruce Emerick, Carriere, MS (US)

( * ) Notice: Subject to any disclaimer, the term of this patent is extended or adjusted under 35 U.S.C. 154(b) by 135 days.

(21) Appl. No.: 14/805,082

(22) Filed: Jul. 21, 2015

(51) Int. Cl.
H02J 7/02 (2016.01)
H02J 7/00 (2006.01)

(52) U.S. Cl.
CPC .......... H02J 7/0042 (2013.01); H02J 7/0052 (2013.01); H02J 7/022 (2013.01)

(58) Field of Classification Search
CPC ........ Y02E 60/12; H02J 7/0045; H02J 7/0055
USPC ........................................................ 320/111
See application file for complete search history.

(56) References Cited

U.S. PATENT DOCUMENTS

| 6,059,081 A | 5/2000 | Patterson et al. |
| 6,230,860 B1 | 5/2001 | Wu |
| D628,151 S | 11/2010 | Wegener et al. |
| 2002/0171396 A1* | 11/2002 | Pettinato ............... H02J 7/0044 320/111 |
| 2003/0111978 A1* | 6/2003 | Wang ..................... H02G 11/02 320/114 |
| 2013/0214730 A1* | 8/2013 | Lu ........................... H02J 7/007 320/107 |
| 2014/0042969 A1* | 2/2014 | Miller ................... H02J 7/0042 320/111 |

* cited by examiner

Primary Examiner — Arun Williams
(74) Attorney, Agent, or Firm — Stevenson IP, LLC

(57) ABSTRACT

The charging and powering device including a first disc member, a housing attached thereto, and an AC-DC transformer within the housing. A charging-powering cord in operational communication with the transformer extends therefrom through a port in a housing external wall. An AC plug and a DC accessory plug are in operational communication with the transformer. The cord rotationally secures to the housing by manually wrapping the cord around the external wall or by utilizing a spring-loaded rewind mechanism within the housing for cord storage. Plug prongs pivotably engage cutouts on one of the first disc member front side or an outside face of a second disc member. The second disc member includes perimeterically-disposed slots having interior bulbous openings for cord retention. A cap engages a channel along a first disc member outer wall. The diameter of the device allows other AC plugs to access the same electrical outlet.

7 Claims, 8 Drawing Sheets

CHARGING AND POWERING DEVICE

BACKGROUND OF THE INVENTION

Current electronic chargers and powering devices for cellphones, personal digital assistant devices, laptop computers, and other portable electronic devices provide an alternating current/direct current (AC-DC) transformer and a relatively long cord to the outlet connection end. The long cords tend to be cumbersome and difficult to transport along with the transformer. Most such devices lack compact storage for the cord. The present charging and powering device addresses the foregoing problem by providing cord storage and various charging and powering connectors for portable electronic devices along with a structure which prevents cord entanglement.

FIELD OF THE INVENTION

The present invention relates to electronic chargers and powering devices.

SUMMARY OF THE INVENTION

The general purpose of the charging and powering device, described subsequently in greater detail, is to provide a device that has many novel features that result in such a device which is not anticipated, rendered obvious, suggested, or even implied by prior art, either alone or in combination thereof.

To accomplish this, the charging and powering device has a first disc member with a channel is disposed in an outer wall thereof. A cylindrical housing has a forward end centrally disposed on a rear side of the first disc member. A second disc member is spaced apart from the first disc member. The second disc member has an inner face spaced apart from an outer face. A port is disposed within the housing external wall.

An alternating current/direct current transformer, referred to hereinafter as AC-DC transformer, is disposed within the housing. A charging-powering cord is in operational communication with the AC-DC transformer and extends from the AC-DC within the housing through the port. Each of an AC plug and a DC accessory plug is in operational communication with the AC-DC transformer. The DC accessory plug is disposed on an exterior end of a charging-powering cord in a position exterior to the port in the external wall. The charging-powering cord is rotationally securable to the housing. The AC plug includes a pair of prongs. A pair of parallel spaced apart generally rectangular cutouts is centrally disposed in one of the front side of the first disc member and an outside face of a second disc member. The prongs are pivotably disposed within the cutouts to pivot from within the respective cutout in a position perpendicular to the housing to exterior relative the respective cutout in a position substantially coplanar with to the housing to facilitate compact transport of the device. An electrical contact is disposed directly adjacent each prong. The AC-DC transformer is in operational communication with each of the electrical contacts via a connector.

The second disc member has an inside face disposed on a rearward end of the housing in a position parallel to the first disc member. The second disc member has a diameter smaller than a diameter of the first disc member. Each of the first disc member and the second disc member has a diameter sized to cover only one of a multi-AC plug electrical outlet. A plurality of radially disposed equally spaced apart slots is continuously disposed through a continuous perimeter of the second disc member. Each slot has an interior bulbous opening disposed proximal a respective one of the cutouts. The slots and their associated bulbous openings are configured to provide cord retention to prevent entanglement of the charging-powering cord.

An alternate method of cord storage is employment of a conventional spring-loaded rewind mechanism disposed within the housing.

A hollow cylindrical cap, which has an open end and an interior wall, is provided to selectively fit over the housing as well as the first disc member. When the second disc member is attached to the housing, the cap also fits over the second disc member. A flexible ridge is continuously disposed along the interior wall parallel to and proximal the open end. The ridge engages the channel. The selective fitting of the cylindrical cap is alternatively provided by screw threads and alternately by cam lock.

The device is not limited to only an accessory plug disposed on the cord but can also be equipped with a plurality of other charging and powering ends. Thus has been broadly outlined the more important features of the present charging and powering device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
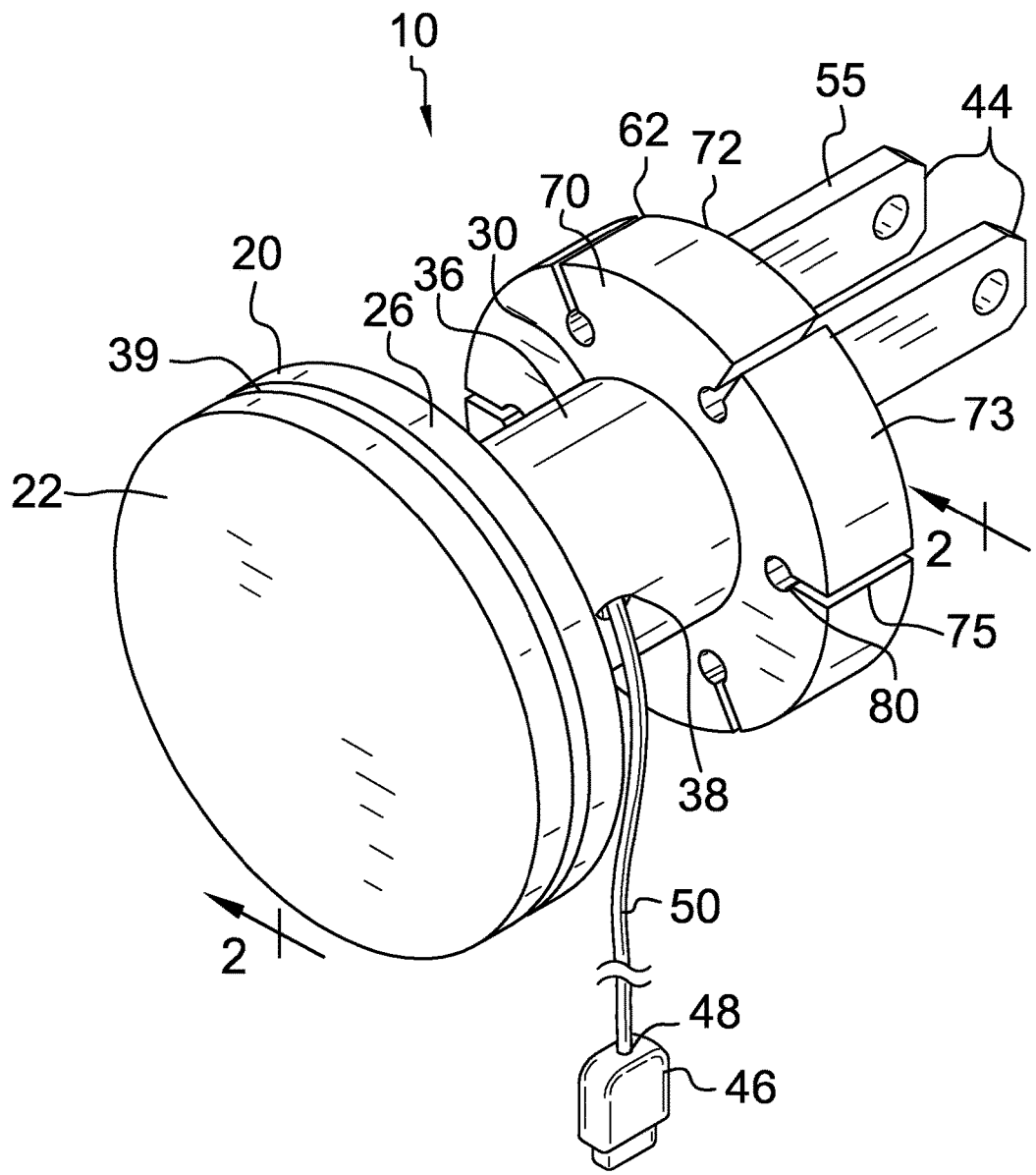
FIG. 1 is a front perspective view.
Figure 2:
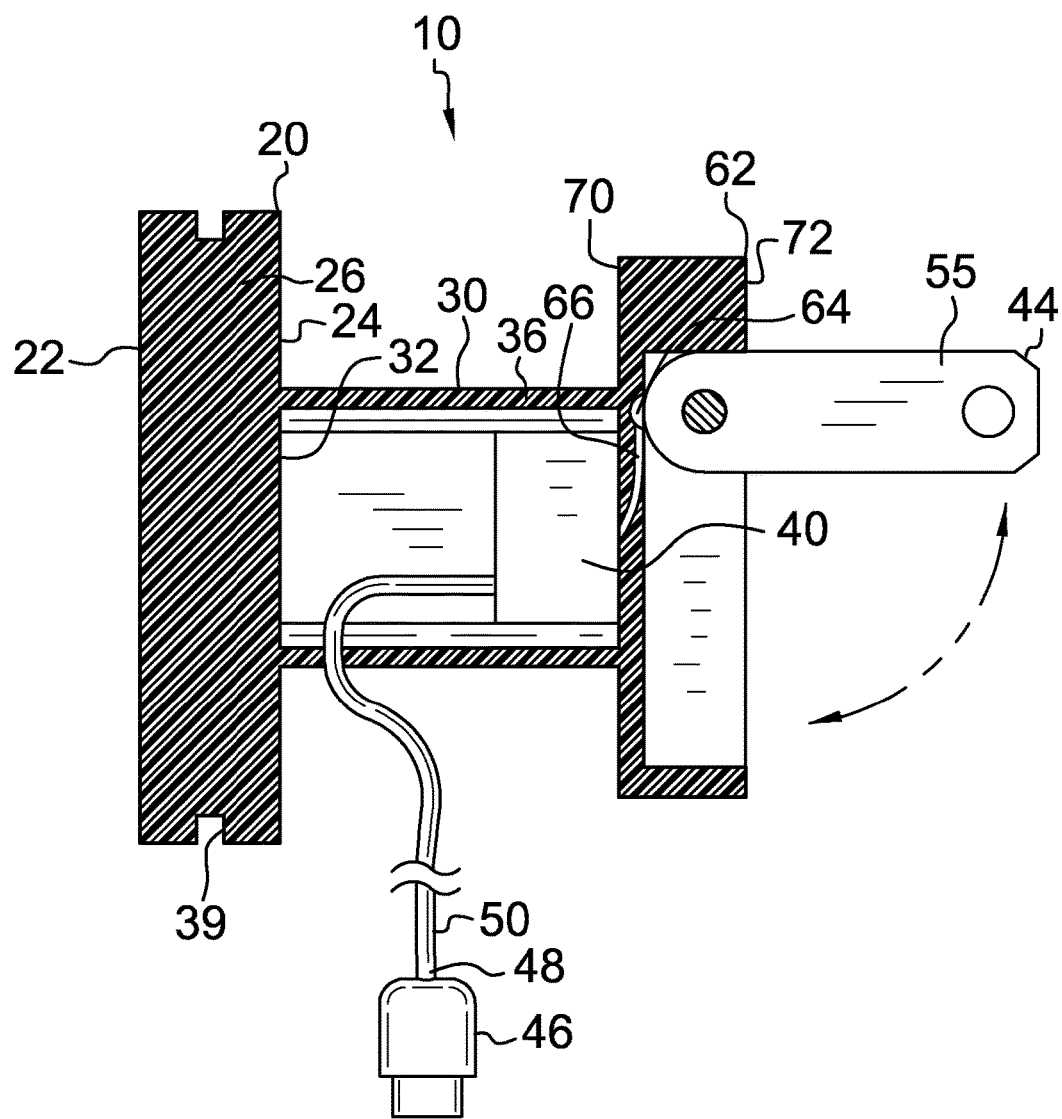
FIG. 2 is a cross-sectional view of FIG. 1 taken along line 2-2.
Figure 3:
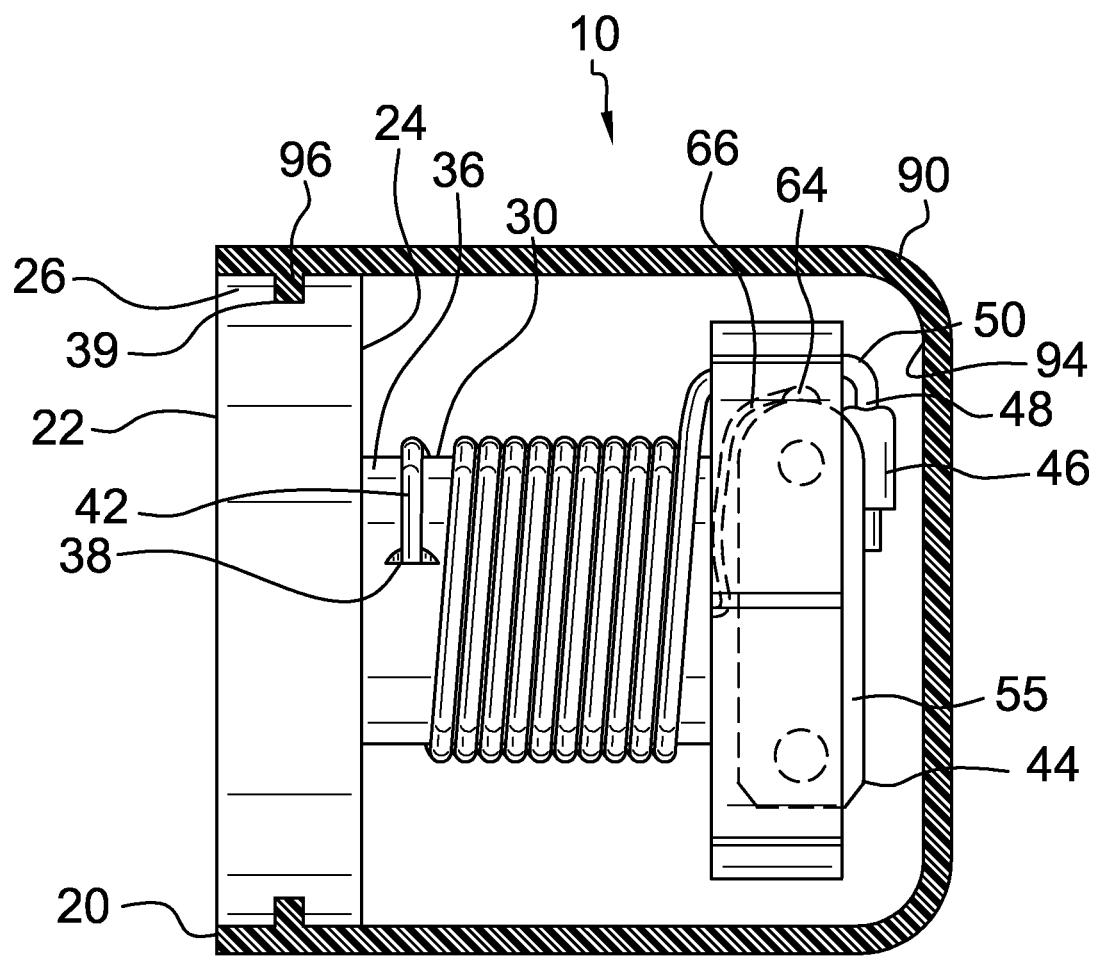
FIG. 3 is a side elevation view showing internal components within a cylindrical housing.
Figure 4:
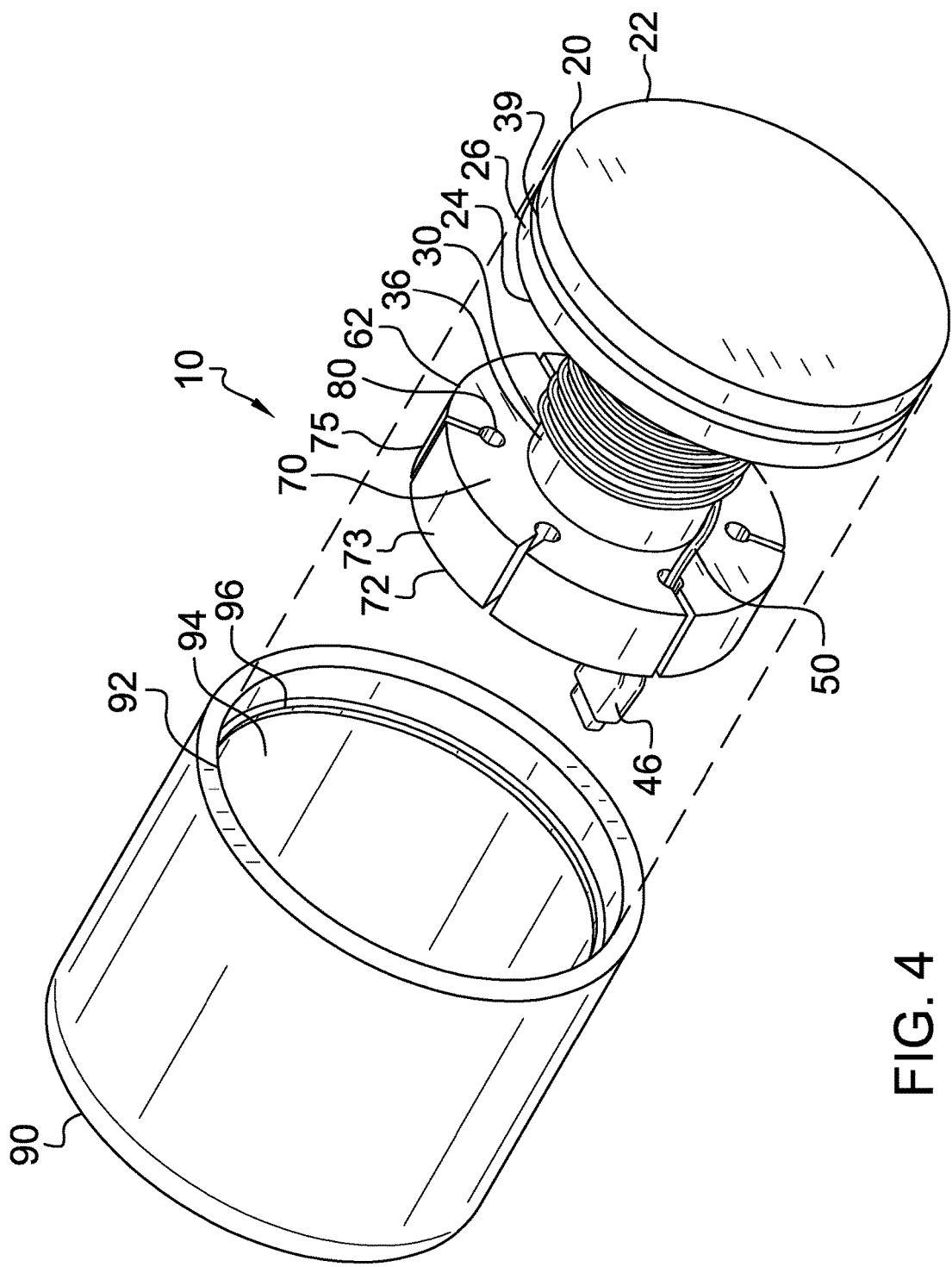
FIG. 4 is an exploded isometric view showing the attachability of a storage cap to a second disc member.
Figure 5:
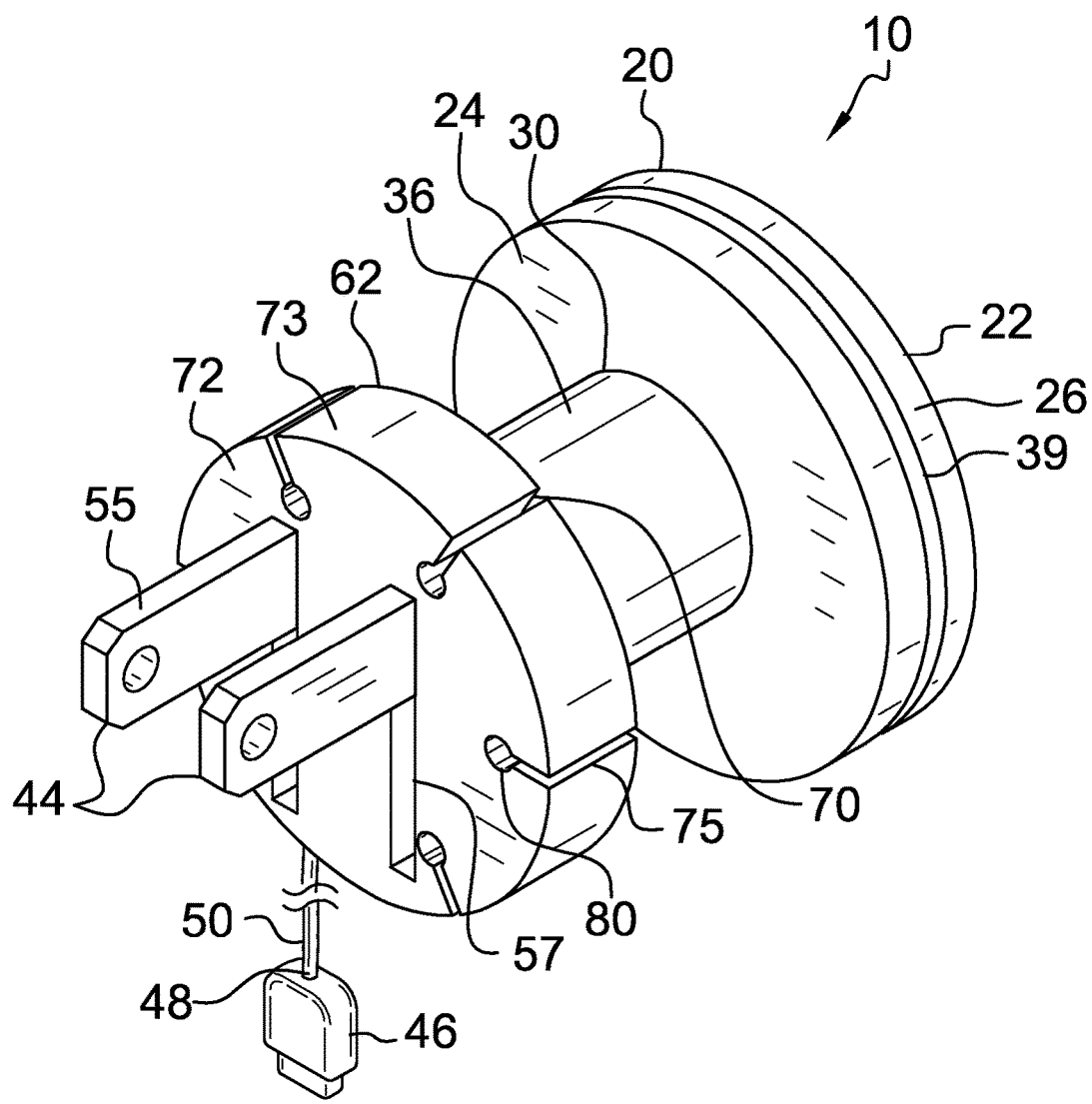
FIG. 5 is a rear perspective view with a pair of electrical prongs extended from the second disc member.
Figure 6:
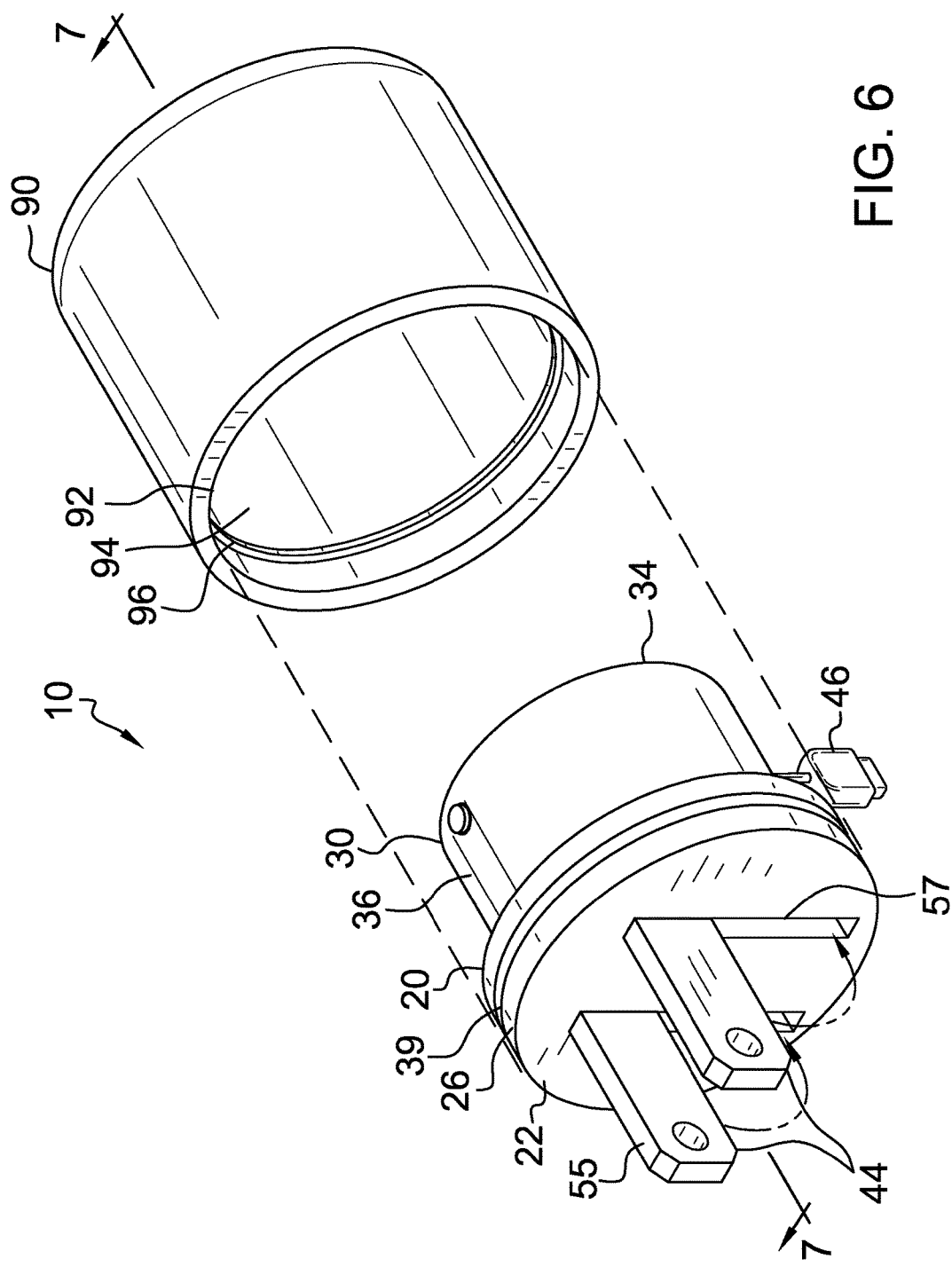
FIG. 6 is a perspective view with the pair of electrical prongs pivoted outwardly from a second disc member.
Figure 7:
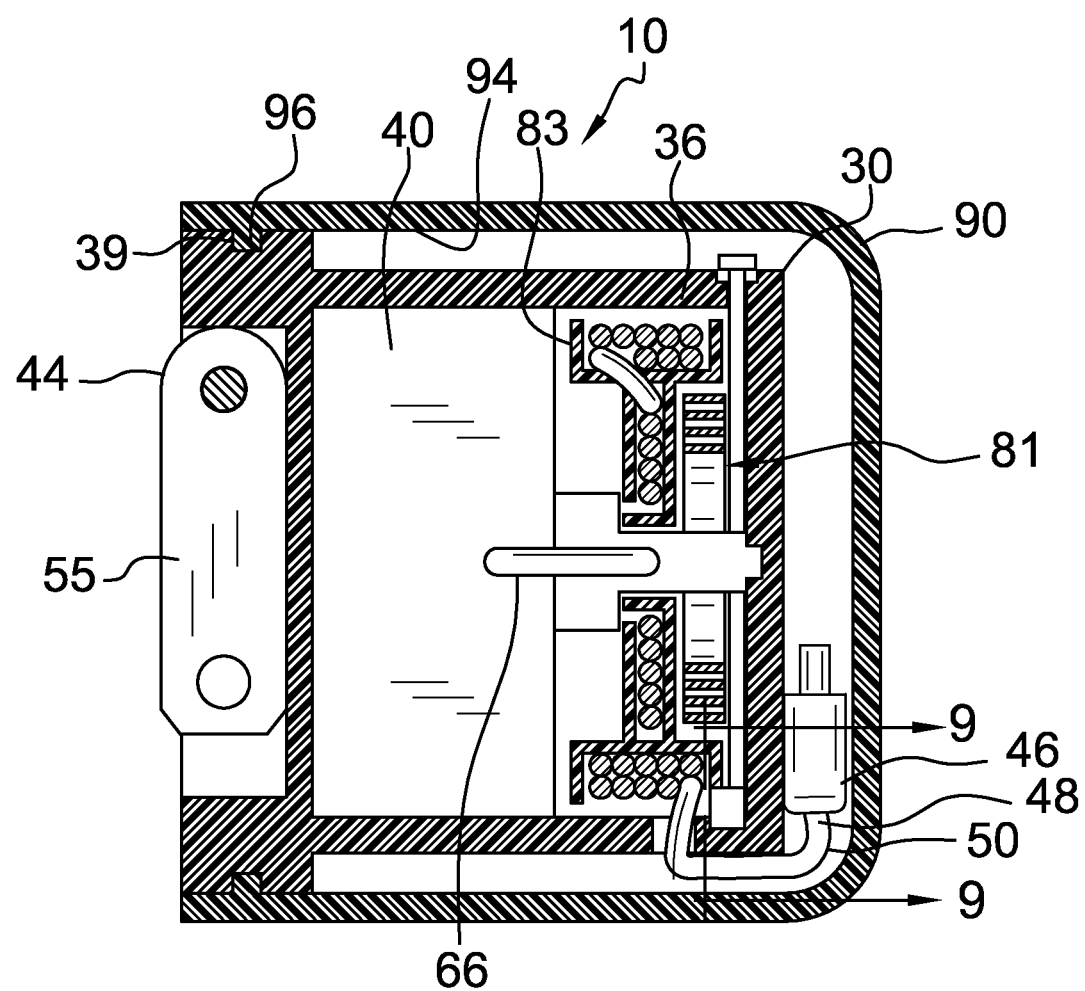
FIG. 7 is a cross sectional view of FIG. 6 taken along line 7-7.
Figure 8:
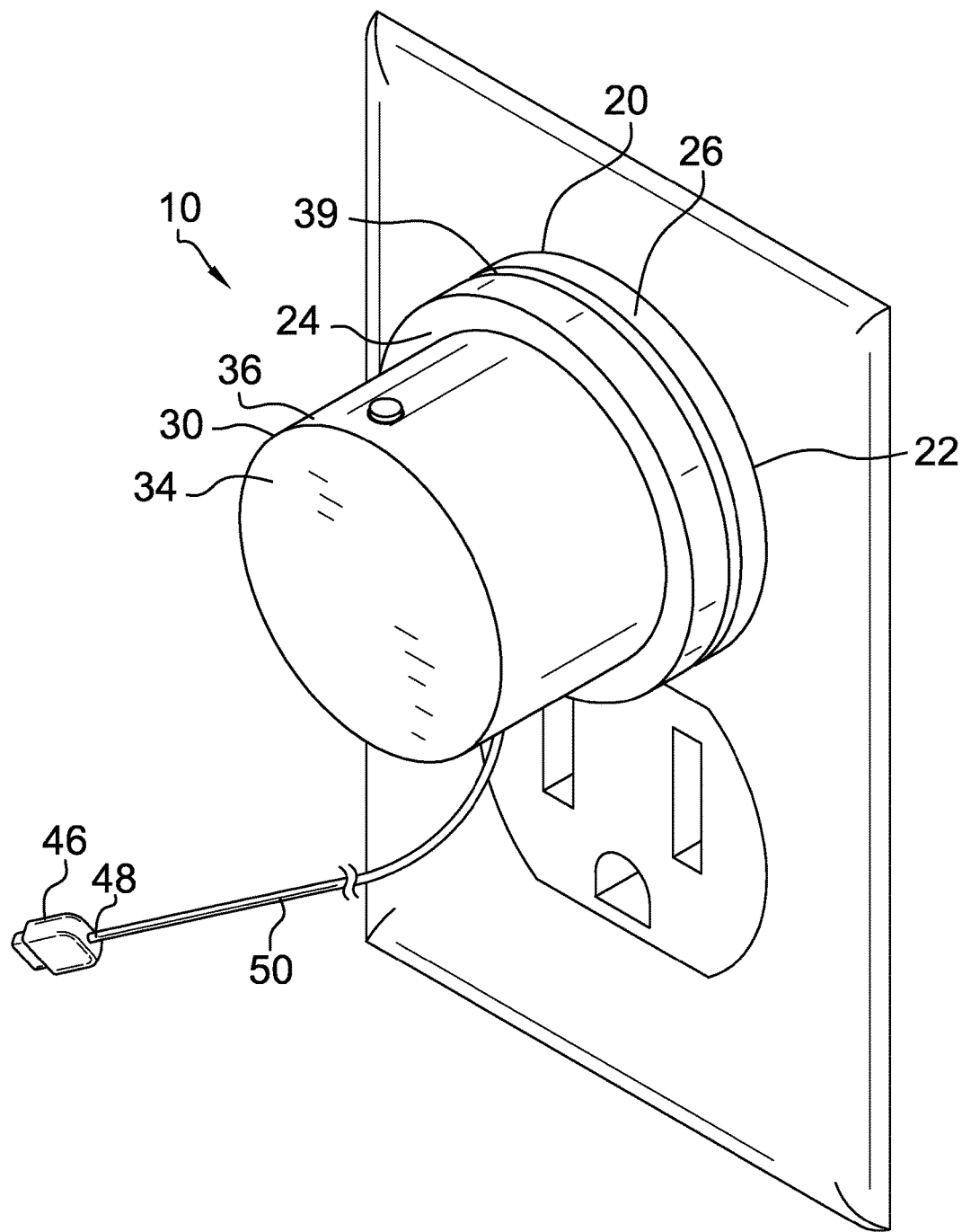
FIG. 8 is an in-use front perspective view in operational communication with an electrical outlet.

With reference now to the drawings, and in particular FIGS. 1 through 8 thereof, an example of the charging and powering device employing the principles and concepts of the present charging and powering device and generally designated by the reference number 10 will be described.

Referring to FIGS. 1 through 8, the charging and powering device 10 includes a first disc member 20 having a front side 22, a rear side 24, and a continuous outer wall 26 disposed between the front and rear sides 22, 24. A cylindrical housing 30 is attached to the first disc member 20 with the housing 30 having a forward end 32 centrally disposed on the rear side 24, a rearward end 34, and an external wall 36 continuously disposed therebetween. A port 38 is disposed within the housing 30 external wall 26. The housing 30 has a smaller diameter than a diameter of the first disc member 20. A continuous channel 39 is centrally disposed in the outer wall of the first disc member 20.

An alternating current/direct current (AC-DC) transformer 40 is disposed within the housing 30. A charging-powering cord 42 is in operational communication with the AC/DC transformer 40 and extends from the AC-DC within the housing 30 through the port 38. Each of an AC plug 44 and a DC accessory plug 46 is in operational communication with the AC-DC transformer 40. The DC accessory plug 46 is disposed on an exterior end 48 of a charging-powering cord 50 in a position exterior to the port 38 in the external wall 36. The charging-powering cord 50 is rotationally securable to the housing 30.

The AC plug 44 includes a pair of prongs 55. A pair of parallel spaced apart generally rectangular cutouts 57 is centrally disposed in one of the front side 22 of the first disc member 20 and an outside face 72 of a second disc member 62. The prongs 55 are pivotably disposed within the cutouts 57 to pivot from within the respective cutout 57 in a position perpendicular to the housing 30 to exterior relative the respective cutout 57 in a position substantially coplanar with to the housing. An electrical contact 64 is disposed directly adjacent each prong 47. The AC-DC transformer 40 is in operational communication with each of the electrical contacts 64 via a connector 66.

The second disc member 62 has an inside face 70, the outside face 72, and a continuous perimeter 73 therebetween. The inside face 70 is disposed on the rearward end 34 of the housing 30 with the second disc member 62 being parallel to the first disc member 20. The second disc member 62 is. The second disc member 62 also has a diameter smaller than a diameter than a diameter of the first disc member 20. Each of the first disc member 20 and the second disc member 62 has a diameter sized to cover only one of a multi-AC plug electrical outlet.

A plurality of radially disposed equally spaced apart slots 75 is continuously disposed through the perimeter 73 of the second disc member 62. Each slot 75 has an interior bulbous opening 80 disposed proximal a respective one of the cutouts 57. The slots 75 and their associated bulbous openings 80 are configured to provide cord retention during storage to prevent entanglement of the charging-powering cord 50.

The rotational securement of the charging-powering cord 50 to the housing 30 is accomplished by manually wrapping the charging-powering cord 50 continuously around the external wall 36 of the housing 30 and securing the accessory plug 46 to one of the openings 80 with one of the slots 75. A conventional spring-loaded rewind mechanism 81 can alternately be disposed in the housing 30 to retain the cord 42 within the housing 30 during storage including a ratcheting, self-retracting reel 83 currently available.

A hollow cylindrical cap 90, which has an open end 92 and an interior wall 94, is provided to selectively fit over the housing 30 as well as the first disc member 20. When the second disc member 62 is attached to the housing 30, the cap 90 also fits over the second disc member 62. A flexible ridge 96 is continuously disposed along the interior wall parallel to and proximal the open end 72. The ridge 96 engages the channel 39. The selective fitting of the cylindrical cap 90 is alternatively provided by screw threads and alternately by cam lock.

What is claimed is:

1. A charging and powering device comprising:
   a first disc member having a front side, a rear side, and a continuous outer wall disposed between the front and rear sides;
   a hollow cylindrical housing attached to the first disc member, the housing having a forward end centrally disposed on the rear side, a rearward end, and an external wall continuously disposed between the forward and rearward ends, wherein the housing has a smaller diameter than a diameter of the housing;
   a continuous channel centrally disposed in the outer wall of the first disc member;
   a port disposed within the housing external wall;
   an AC-DC transformer disposed within the housing;
   a charging-powering cord in operational communication with the AC-DC transformer and extending from the AC-DC transformer within the housing through the port, the charging-powering cord rotationally securable to the housing;
   each of an AC plug and a DC accessory plug in operational communication with the AC-DC transformer, wherein the DC accessory plug is disposed on an exterior end of the charging-powering cord in a position exterior to the port in the external wall, wherein the AC plug has a pair of prongs;
   a pair of parallel spaced apart substantially rectangular cutouts centrally disposed in one of the front side of the first disc member and an outside face of a second disc member, wherein the prongs of the AC plug are pivotably disposed within the cutouts to pivot from within the respective cutout in a position perpendicular to the housing to exterior relative the respective cutout in a position substantially coplanar with the housing; and
   an electrical contact disposed directly adjacent each prong, wherein the AC-DC transformer is in operational communication with each of the electrical contacts via a connector;
   wherein the charging-powering cord has a first condition and a second condition, wherein in the first condition, the charging-powering cord is securable continuously around the external wall of the housing and wherein in the second condition, the charging-powering cord is securable continuously around a ratcheting, self-retracting reel disposed within the housing via a ratcheting mechanism.

2. The charging and powering device of claim 1 further comprising a spring-loaded rewind mechanism disposed in the housing, wherein the rewind mechanism includes a ratcheting, self-retracting reel, wherein the rewind mechanism is configured to retain the charging-powering cord within the housing during storage.

3. The charging and powering device of claim 1 comprising:
   a hollow cylindrical cap having an open end and an interior wall;
   a flexible ridge continuously disposed along the interior wall parallel to and proximal the open end, wherein the ridge engages the channel.

4. The charging and powering device of claim 1 comprising:
   wherein the second disc member has an inside face disposed on the rearward end of the housing, the inside face, and a continuous perimeter disposed therebetween, wherein the second disc member is parallel to the first disc member;
   wherein the second disc member has a diameter smaller than a diameter of the first disc member;
   wherein each of the first disc member and the second disc member has a diameter sized to cover only one of a multi-AC plug electrical outlet.

5. The charging and power device of claim 4 further comprising:

a plurality of radially disposed equally spaced apart slots continuously disposed through the perimeter of the second disc member, each slot having an interior bulbous opening disposed proximal a respective one of the cutouts;
  wherein the slots and the respective bulbous openings are configured to provide cord retention to prevent entanglement of the charging-powering cord with the DC accessory plug being adjacent the outside face of the second disc member.

6. A charging and powering device comprising:
  a first disc member having a front side, a rear side, and a continuous outer wall disposed between the front and rear sides;
  a hollow cylindrical housing attached to the first disc member, the housing having a forward end centrally disposed on the rear side, a rearward end, and an external wall continuously disposed between the forward and rearward ends, wherein the housing has a smaller diameter than a diameter of the housing;
  a continuous channel centrally disposed in the outer wall of the first disc member;
  a port disposed within the housing external wall;
  an AC-DC transformer disposed within the housing;
  a charging-powering cord in operational communication with the AC-DC transformer and extending from the AC-DC transformer within the housing through the port, the charging-powering cord rotationally securable to the housing;
  each of an AC plug and a DC accessory plug in operational communication with the AC-DC transformer, wherein the DC accessory plug is disposed on an exterior end of the charging-powering cord in a position exterior to the port in the external wall, wherein the AC plug has a pair of prongs;
  a pair of parallel spaced apart substantially rectangular cutouts centrally disposed in the front side of the first disc member, wherein the prongs of the AC plug are pivotably disposed within the cutouts to pivot from within the respective cutout in a position perpendicular to the housing to exterior relative the respective cutout in a position substantially coplanar with the housing; and
  an electrical contact disposed directly adjacent each prong, wherein the AC-DC transformer is in operational communication with each of the electrical contacts via a connector;
  a hollow cylindrical cap having an open end and an interior wall; and
  a flexible ridge continuously disposed along the interior wall parallel to and proximal the open end, wherein the ridge engages the channel;
  wherein the charging-powering cord is securable continuously around a ratcheting, self-retracting reel of spring-loaded rewind mechanism disposed within the housing.

7. A charging and powering device comprising:
  a first disc member having a front side, a rear side, and a continuous outer wall disposed between the front and rear sides;
  a hollow cylindrical housing attached to the first disc member, the housing having a forward end centrally disposed on the rear side, a rearward end, and an external wall continuously disposed between the forward and rearward ends, wherein the housing has a smaller diameter than a diameter of the housing;
  a continuous channel centrally disposed in the outer wall of the first disc member;
  a port disposed within the housing external wall;
  an AC-DC transformer disposed within the housing;
  a charging-powering cord in operational communication with the AC-DC transformer and extending from the AC-DC transformer within the housing through the port, the charging-powering cord rotationally securable to the housing;
  each of an AC plug and a DC accessory plug in operational communication with the AC-DC transformer, wherein the DC accessory plug is disposed on an exterior end of the charging-powering cord in a position exterior to the port in the external wall, wherein the AC plug has a pair of prongs;
  a pair of parallel spaced apart substantially rectangular cutouts centrally disposed in an outside face of a second disc member, wherein the prongs of the AC plug are pivotably disposed within the cutouts to pivot from within the respective cutout in a position perpendicular to the housing to exterior relative the respective cutout in a position substantially coplanar with the housing; and
  an electrical contact disposed directly adjacent each prong, wherein the AC-DC transformer is in operational communication with each of the electrical contacts via a connector;
  a hollow cylindrical cap having an open end and an interior wall;
  a flexible ridge continuously disposed along the interior wall parallel to and proximal the open end, wherein the ridge engages the channel
  wherein the charging-powering cord is securable continuously around the external wall of the housing;
  wherein the second disc member has an inside face disposed on the rearward end of the housing, the inside face, and a continuous perimeter disposed therebetween, wherein the second disc member is parallel to the first disc member, further wherein the second disc member is;
  wherein the second disc member has a diameter smaller than a diameter of the first disc member;
  wherein each of the first disc member and the second disc member has a diameter sized to cover only one of a multi-AC plug electrical outlet;
  a plurality of radially disposed equally spaced apart slots continuously disposed through the perimeter of the second disc member, each slot having an interior bulbous opening disposed proximal a respective one of the cutouts;
  wherein the slots and the respective bulbous openings are configured to provide cord retention to prevent entanglement of the charging-powering cord with the DC accessory plug being adjacent the outside face of the second disc member.

* * * * *